United States Patent [19]

Carpenter

[11] Patent Number: 5,147,031
[45] Date of Patent: Sep. 15, 1992

[54] FLAT STROKE CONVEYOR

[75] Inventor: James H. Carpenter, Hagerstown, Md.

[73] Assignee: Pangborn Corporation, Hagerstown, Md.

[21] Appl. No.: 683,249

[22] Filed: Apr. 10, 1991

[51] Int. Cl.$^5$ ............................................. B65G 25/00
[52] U.S. Cl. .................................. 198/750; 198/765
[58] Field of Search ...................... 198/750, 765, 861.5; 414/156, 198, 525.1

[56] References Cited

U.S. PATENT DOCUMENTS

| 2,473,193 | 6/1949 | Campion | 198/750 X |
| 3,212,630 | 10/1965 | Allen et al. | 198/750 X |
| 4,129,419 | 3/1980 | Brodin | 198/750 |
| 4,505,380 | 3/1985 | McLemore et al. | 198/750 |

FOREIGN PATENT DOCUMENTS

| 0950622 | 8/1982 | U.S.S.R. | 198/750 |
| 1177232 | 9/1985 | U.S.S.R. | 198/750 |
| 1257034 | 9/1986 | U.S.S.R. | 198/750 |
| 1498674 | 8/1989 | U.S.S.R. | 198/750 |

*Primary Examiner*—Robert P. Olszewski
*Assistant Examiner*—James R. Bidwell
*Attorney, Agent, or Firm*—Charles E. Brown

[57] ABSTRACT

This relates to an oscillating or reciprocating conveyor wherein the work pieces move in a single plane, generally horizontal, and wherein the conveyor, if desired, may also be a rocking conveyor. This particularly relates to a drive for such a conveyor wherein the conveyor is moved in the work piece advanced direction by a fluid cylinder and wherein there are compression springs for moving the conveyor rearwardly at the end of each forward stroke. More particularly, there are provided rapid exhaust systems for cylinders whereby the conveyor and work pieces carried thereby may be advanced at a relatively slow uniform rate and at least at certain predetermined periods the fluid cylinder can be rapidly exhausted and driven by the spring or springs so as to rapidly reverse the direction of movement of the conveyor with the result that the conveyor moves rearwardly while the advanced work pieces remain stationary. If desired, a suitable shock absorber arrangement may also be provided. The fluid system may include valving which permits the back and forth reciprocation of the conveyor and work pieces carried thereby beneath a blast wheel followed by a periodical rapid return of the conveyor so that the work pieces are in effect advanced relative to the blast wheel.

9 Claims, 4 Drawing Sheets

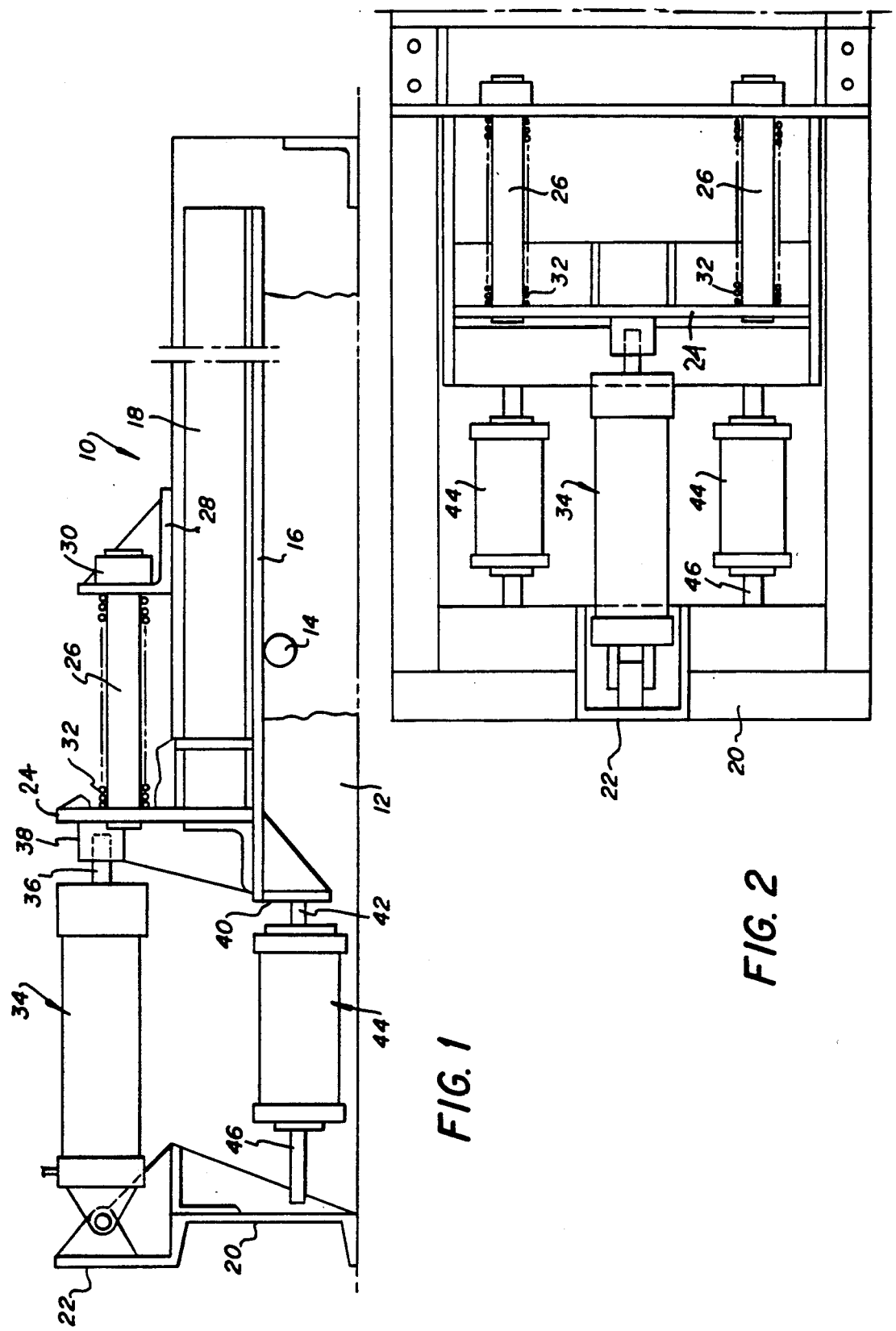

FLAT STROKE CONVEYOR

This invention relates in general to new and useful improvements in flat stroke conveyors, and more particularly to a spring loaded drive for a flat stroke conveyor.

BACKGROUND OF THE INVENTION

It is known to provide flat stroke conveyors. Such conveyors may be reciprocating conveyors only or a combination of a reciprocating conveyor and a rocking conveyor. It is further known to provide drives for such reciprocating conveyors which will produce the desired reciprocations of a work piece to effect reciprocation of the work piece relative to a blast wheel or wheels and to periodically rapidly return the conveyor so that the work pieces will retain their advanced positions and thus progressively move past the blast area of a blast wheel. However, such drive units are relatively large and relatively heavy and suitable primarily only for very large work pieces, such as engine blocks and the like. At the same time, however, such drives are very expensive.

OBJECT OF THE INVENTION

In view of the foregoing, it is a primary object of this invention to provide an inexpensive drive for a flat stroke conveyor wherein the output of the conveyor is relatively low. To this end, it is proposed to periodically advance work pieces on the conveyor by advancing the conveyor utilizing a fluid cylinder or other advance means and returning the conveyor utilizing a compression spring which will provide a snapping action such that the conveyor will move rearwardly to its starting position while the work piece stands still similar to pulling a tablecloth out from under a dish on a table.

With the above and other objects in view that will hereinafter appear, the nature of the invention will be more clearly understood by reference to the following detailed description, the appended claims, and the several views illustrated in the accompanying drawings.

FIG. 1 is a side elevational view of a reciprocating conveyor utilizing a drive formed in accordance with this invention with intermediate parts of the conveyor broken away.

FIG. 2 is a fragmentary top plan view of the drive end of the conveyor of FIG. 1.

Figure 3:
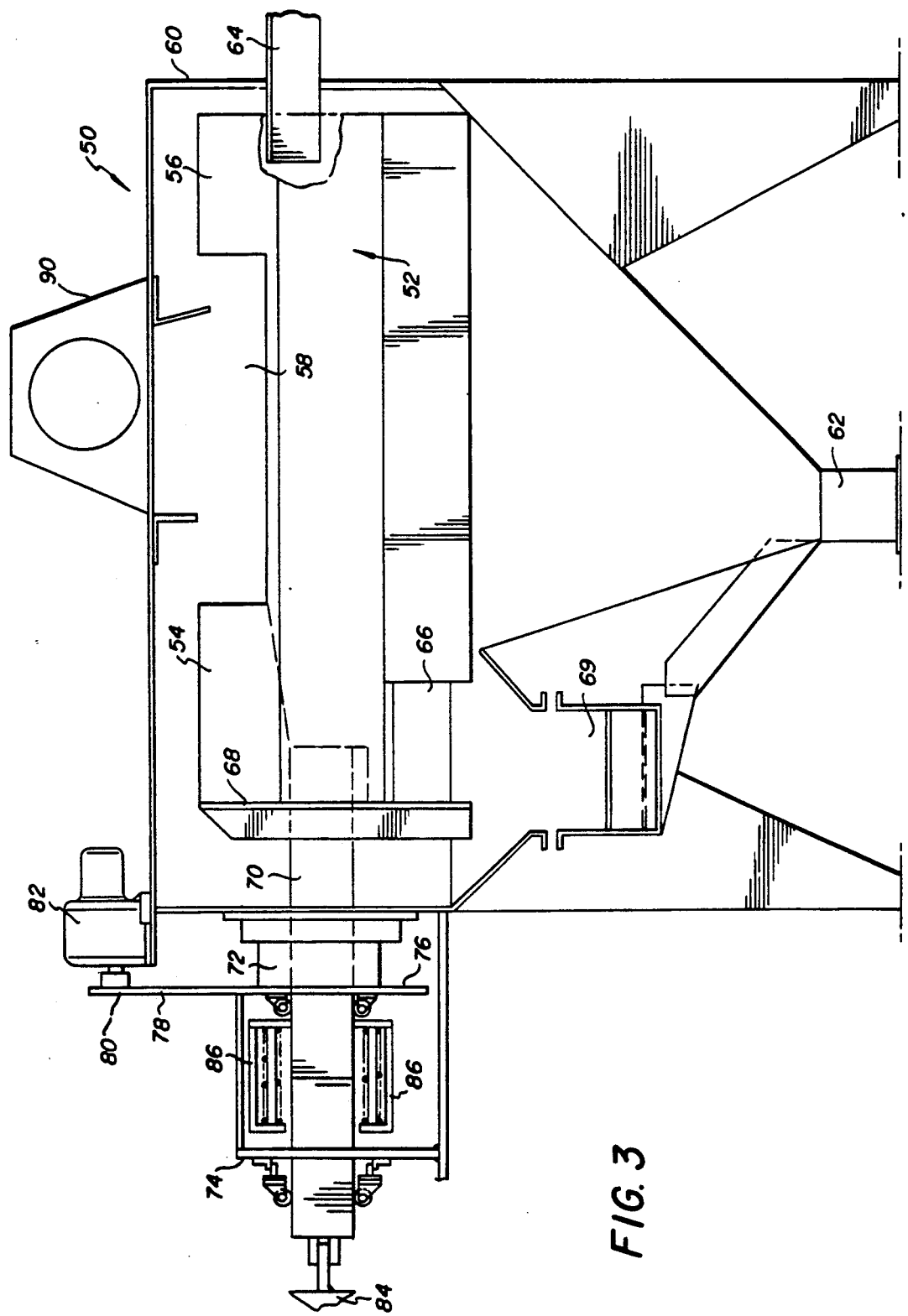
FIG. 3 is a schematic elevational view of an abrasive cleaning machine utilizing a cantalevered conveyor which is mounted for both reciprocating and rocking movement utilizing a drive in accordance with this invention.

Referring now to the drawings in detail, it will be seen that there is illustrated in FIG. 1 a simple reciprocating conveyor utilizing a reciprocating drive in accordance with this invention. The conveyor, generally identified by the numeral 10, includes a supporting frame 12 which carries at longitudinally spaced intervals two sets of rollers 14. Each set of rollers 14 is formed of two rollers disposed in transverse alignment and having seated thereon the base 16 of a reciprocating conveyor 18. Suitable guide means (not shown) will be provided for maintaining the conveyor 18 in axial alignment with the base 16.

At the left hand end of the base 16 there is a transversely extending lower end member 20 which carries an upper transversely extending end member 22.

At the left end of the conveyor 18 there is an upstanding transversely extending head member 24 which is suitably reinforced and which carries one or more longitudinally extending pins 26. The opposite end of the pin or pins 26 extends through a stationary transverse member 28 and each pin is provided with a stop preferably in the form of a nut 30. Between the transverse members 24, 28, each pin 26 carries a coiled compression spring 32 which is preferably slightly compressed in its relaxed state.

The upper transverse member 22 pivotally carries one end of a fluid cylinder 34 which is the type having a piston (not shown) which carries a longitudinally extending piston rod 36. The piston rod 36 is coupled as at 38 to a fitting carried by the transverse head member 24.

The conveyor base 16 is provided at the left hand end thereof with a transverse member 40 to which there is attached the activating rod 42 of a shock absorber 44 which has a supporting shaft 46 carried by the transverse member 20.

BASIC OPERATION

It will be readily apparent from FIG. 1 that when a suitable fluid, such as hydraulic fluid or air, is introduced into the left end of the fluid cylinder 34, the piston rod 36 will be moved to the right, moving the conveyor 18 to the right. As the conveyor 18 moves to the right, the spring or springs 32 will be compressed. Then, if the left end of the cylinder 34 is rapidly exhausted, the spring or springs 32 will snap the conveyor 18 back to the left leaving the work pieces in their advanced positions. The shock absorber 44 will absorb the shock of the stopping of the conveyor at the end of its return stroke.

The specifics of the operation of the drive for the conveyor 18 will be set forth in more detail with respect to the description of the various possible drive arrangements.

Referring now to FIG. 3, it will be seen that there is illustrated a schematic elevational view of an abrasive cleaner 50 which is provided with a conveyor 52 which is mounted for axial reciprocation and rotary movement. The conveyor 52 is preferably generally hexagonal in cross section at its opposite ends as at 54 and 56 and is provided with an open top portion 58.

The conveyor 52 is mounted within a housing 60 which is carried by a suitable vertical support 62 and is generally hollow.

The conveyor 52 is open at its right end and a suitable conveyor 64 leads into the open right end of the conveyor 52 so as to direct work pieces into the interior of the conveyor 52.

It will also be seen that a lower left bottom portion 66 of the conveyor is cut away and that the left end of the conveyor 52 is closed by an end plate 68. Thus work pieces to be cleaned are led into the right end of the conveyor 52, are progressively moved through the conveyor 52 and drop out the open left end portion 66 into a discharge chute 69.

The conveyor 52 is provided at its left end with an axial support or head member 70 which supports the conveyor 52 in cantilevered relation for both axial reciprocating movement and rocking movement. The axial support or head member 70 extends through an axially supporting fixed head or support member 72 which is mounted for rotation within two axially spaced bearings 74. The supporting head or support member is provided with an enlarged driven sprocket 76 which is driven through a drive chain 78 from a drive sprocket 80 carried by a suitable drive motor 82. The axial support or head member 70 is coupled to a fluid cylinder 84 for the reciprocatory movement and is provided with a specific drive arrangement including compressible springs 86 and shock absorbers 88 shown only in FIG. 4.

It will be seen from FIG. 3 that a housing 60 carries an abrasive throwing wheel unit 90 for directing abrasive particles down through the upper notch 58 formed in the conveyor 52 so as to direct abrasive particles against work pieces carried within the conveyor 52.

Figure 4:
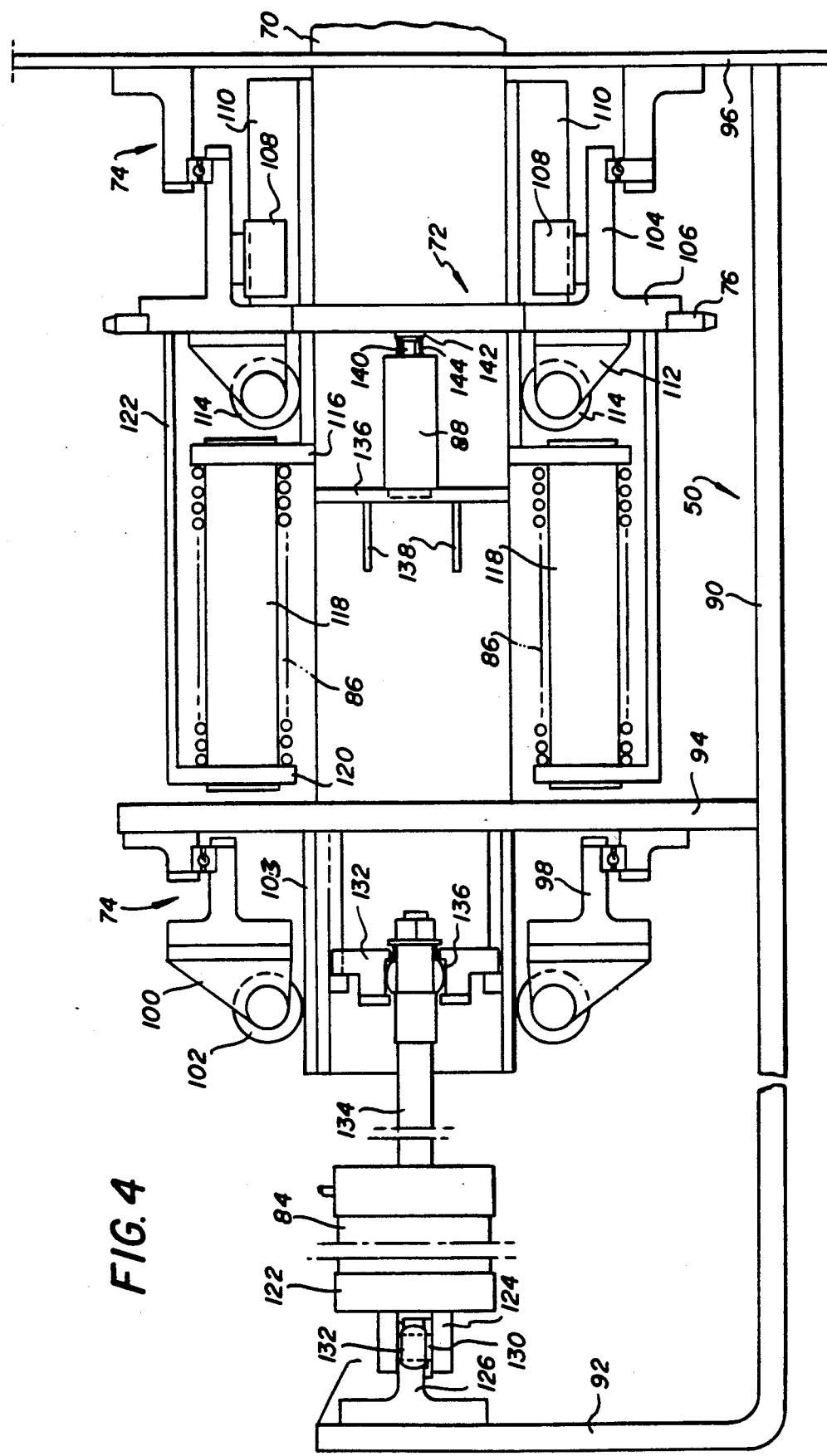
FIG. 4 is an enlarged schematic side elevational view of the drive end of the abrasive cleaning machine of FIG. 3 and shows the mounting of the conveyor for both reciprocating and rocking movement utilizing a drive in accordance with this invention.

Referring now to FIG. 4, it will be seen that the abrasive cleaning machine 50 includes a supporting frame having a base 90 with an upstanding left end 92. The base 90 carries two vertical bulkheads 94, 96 on which the two bearings 74 are mounted. The bearings 74 carried by the bulkhead 94 supports a ring 98 which forms a front part of the support member 72. The support ring 98 has an upper part thereof carrying two transversely spaced angle brackets 100 each of which carries a heavy duty roller 102. The rollers 102 have bearing against the same a heavy duty wear plate 103.

The bearing 74 carried by the bulkhead 96 carries a rear ring 104 which in turn carries a bulkhead 106 rotatable with the ring 104.

The ring 104 carries at least two pairs of rollers 108 arranged in transversely adjacent sets for engaging opposite sides of longitudinal ribs 110 to thereby effect rocking of the axial support 70 and the conveyor 52 with the support member 72 while at the same time permitting relative reciprocating movement between the axial support 70 and the support member 72.

The bulkhead 106, on the side thereof remote from the ring 104 is provided with sets of angle brackets 112 each of which carries a roller 114 with a longitudinal axis. The rollers 114 are arranged in upper and lower sets and spaced apart so as to clear the ribs 110 and thus support the axial support 70 for axial reciprocating movement relative to the support member 72.

It will be seen that the sprocket 76 is carried by the moveable bulkhead 106.

The axial support 70, to the left of the bulkhead 106, carries a ring 116 which, in turn, has a large pin 118 for each of the springs 86 extending therethrough.

Adjacent the bulkhead 94 and facing the ring 116 is another ring 120 which is carried by the movable bulkhead 106 by way of a plurality of arms 122 or a sleeve. The rings 120 fixedly carry the pins 118 on which the springs 86 are mounted for compressive collapsing movement.

Viewing the left of FIG. 4, it will be seen that the fluid cylinder 84 has an end cap 122 with a bifurcated mounting fitting 124 disposed on opposite sides of a stem 126 of a T-shaped mounting bracket 128 carried by the front wall 92. A pin 130 extends through the bifurcated fitting 124 and the stem 126 and connect the two together by way of a self aligning member 132.

The axial support 70 is provided within the left end thereof with a transverse member 132 which receives an end of a piston rod 134 of the cylinder 84 within a universal type connection 136.

Finally, the shock absorbers 88 are disposed on opposite sides of the axial support 70 and are carried by flanges 136 which are reinforced by gussets 138. Each shock absorber 88 includes a shaft 140 having a head 142 contacting the movable bulkhead 106. The shaft 140 is preferably surrounded by a compression spring 144.

Figure 5:
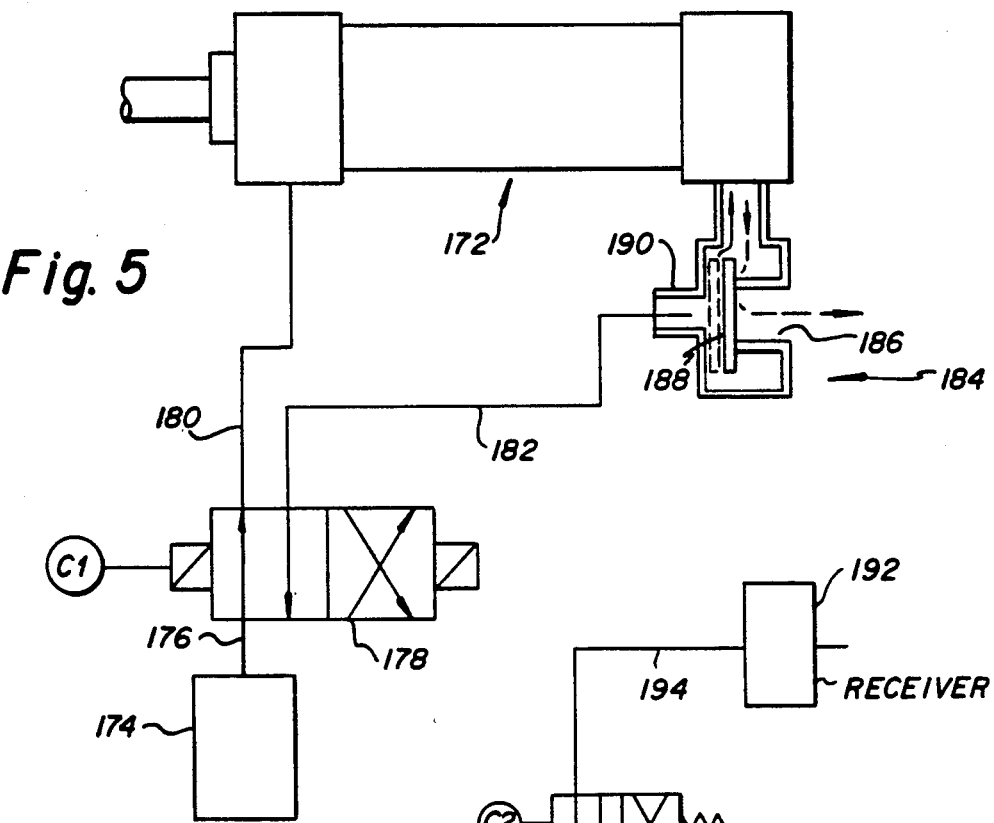
FIG. 5 is another schematic elevational view of a fluid system for operating an air cylinder of a drive in accordance with this invention.
Figure 6:
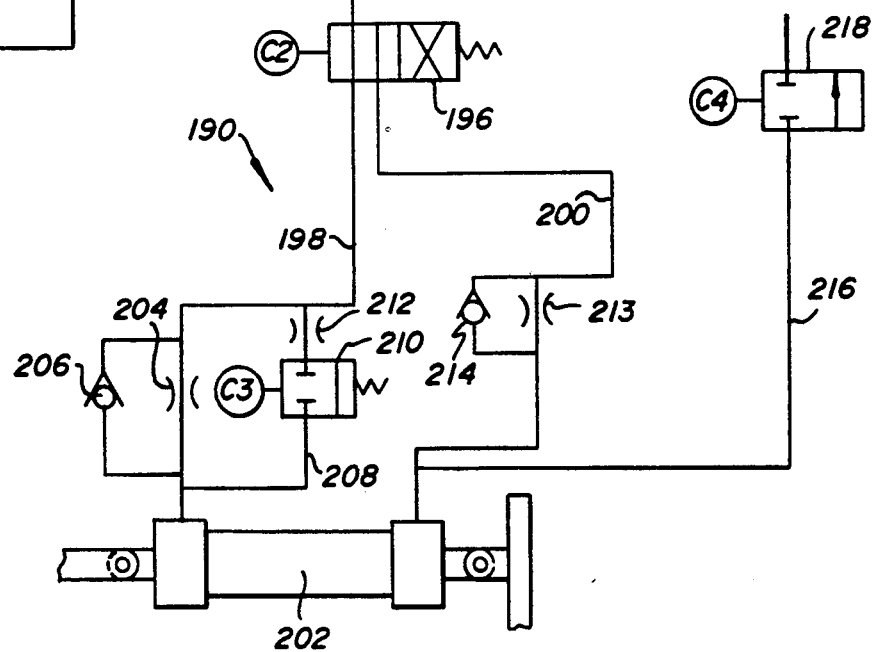
FIG. 6 is another schematic of a fluid system for operating a hydraulic cylinder in accordance with this invention.

The two conveyor systems shown in FIGS. 1 and 2 and 3 and 4, respectively, may be provided with one of several controlled systems as is specifically illustrated in FIGS. 5, and 6. It is to be understood that the fluid cylinders 34 and 84 may each be operated by each of the two systems.

Reference is now made to FIG. 5 wherein there is illustrated an air system in which there is illustrated a cylinder 172 which is a double acting cylinder. The system includes a receiver 174 containing a large volume high pressure air supply which is coupled by a line 176 to a four-way valve 178 which is actuated by a controller C1. A first line 180 extends from the valve 178 to one end of the cylinder 172 while a second line 182 is coupled to the opposite end of the cylinder 172 by way of an exhaust valve generally identified by the numeral 184. The exhaust valve 184 has a very large exhaust port 186 controlled by a diaphragm 188 with the exhaust port 186 being closed and air under pressure supplied to the right end of the cylinder 172 through the valve 184 through a supply port 190.

It will be apparent that when the valve 178 is shifted to its left hand position, the left end of the cylinder 172 will be exhausted and air under pressure will be directed through the valve 184 to the right end of the cylinder 172. This would advance the associated conveyor compressing the associated springs. Then when the valve 178 is shifted to the right, as shown in FIG. 5, air will be directed to the left end of the cylinder 172 to aid the springs in moving the piston thereof to the right while at the same time the diaphragm 188 will be free to move to open the exhaust port 186 whereby a large volume of air may exit from the right end of the cylinder 172 to permit the rapid return of the piston of the cylinder.

Reference is now made to the fluid system of FIG. 6, which fluid system is generally identified by the numeral 190 and provides for periodic slow back and forth movement of the parts being cleaned to effect a better cleaning operation followed by perioic rapid return of the conveyor to effect advance of the work pieces. The system 190 includes a receiver 192 which preferably receives a supply of compressed air and does have a large volume of high pressure air available for use. A supply line 194 supplies air from the receiver 192 to a four-way valve 196 which is repeatedly reversely shifted by way of a controlled device C2. Two lines 198, 200 extend from the valve 196 with the line 198 being coupled to the left end of a cylinder 202 through a speed control orifice 204 and one-way through a check valve 206.

A line 208 extends around the speed control orifice 204 and the one-way check valve 206 in parallel relation through a two-way valve 210 and a flow control orifice 212. The valve 210 is repeatedly actuated by a controller C3.

The line 200 is coupled to the right end of the cylinder 202 and it has incorporated therein a speed control orifice 213 and a one-way valve 214

The line 200 also has branching therefrom intermediate the right end of the cylinder 202 and the speed control orifice 213 and the valve 214 a large exhaust line 216 which is connected to a large two-way valve 218 which is positioned by means of a controller C4.

When the valves 210 and 218 are closed and the valve 196 is periodically reciprocated, and the valve 196 is in the illustrated position, the cylinder 202 will be in its slow return position with air under pressure being directed into the left end of the cylinder 202 and the right end of the cylinder 202 being exhausted and the cylinder speed is controlled by speed control orifice 213. Then when the valve 196 is in its other position, the flow of air will be reversed with air being directed into the right end of the cylinder 202 and exhausted from the left end of the cylinder and the cylinder speed is controlled by the speed control orifice 204. Thus, the controller C2 can be utilized to reciprocate the associated conveyor back and forth slowly with the return being generally at the same speed as the advance to merely reciprocate work pieces relative to an associated blast wheel. Then when the work pieces are to be advanced, the valves 210 and 218 are actuated by their respective controllers while the valve 196 is in its illustrated position of FIG. 6. The net result is that air is rapidly directed into the left hand side of the cylinder 202 through check valve 206 while the right hand end of cylinder is rapidly exhausted both through the valve 213 and the valve 218. During this stage of rapid exhaust, the associated conveyor is rapidly moved by the springs and the cylinders relative to work pieces in its return stroke so as to leave the work pieces in the advanced positions.

In addition when the valve 196 is in its cylinder advance position fluid is directed to the right end of the cylinder 202 primarily through check valve 214 to rapidly advance the cylinder at a speed which will still cause movement of work pieces with the conveyor with the speed being controlled by valves 210 and 212.

If desired, the several exhausts may be coupled to a reservoir and the system 190 could be a hydraulic system.

Although only several preferred embodiments of conveyor and spring constructions and several fluid drive systems have been specifically illustrated and described herein, it is to be understood that other variations may be made within the scope of the appended claims.

I claim:

1. A spring actuated flat stroke drive for an oscillating conveyor, said drive comprising a head member for supporting at least one end of a conveyor, a fluid cylinder coupled to said head member and forming feed means for periodically axially advancing said head member, a spring unit opposing said head member and forming resilient return means for rapidly returning said head member after each axially advance, and fluid flow control means for said fluid cylinder, said fluid flow control means comprising a source of fluid under pressure coupled to said fluid cylinder through a flow control valve to progressively advance said head member, an axially fixed support member, means mounting said support member for rotary movement, about an axial axis and cooperating mounting means on said head member and said support member mounting said head member both for rotary movement with said support member about said axial axis and for axial movement relative to said support member.

2. A drive according to claim 1 wherein said fluid cylinder has an axis extending generally along said axial axis, and said spring unit includes a plurality of coil springs having axes circumferentially spaced about said axial axis.

3. A drive according to claim 1 together with a fixed support member, and said spring unit extends between said head member and said fixed support member.

4. A drive according to claim 3 wherein said fluid cylinder has an axis extending generally along said axial axis, and said spring unit includes a plurality of coil springs having axes circumferentially spaced about said axial axis.

5. A drive according to claim 1 together with a fixed support member, and a shock absorber unit extending between said head member and said fixed support member.

6. A drive according to claim 5 wherein said fluid cylinder has an axis extending generally along said axial axis, and said spring unit includes a plurality of coil springs having axes circumferentially spaced about said axial axis.

7. A drive according to claim 6 wherein said shock absorber unit includes a plurality of axial shock absorbers having axes circumferentially spaced around said axial axis.

8. A drive according to claim 6 wherein said shock absorber unit include a plurality of axial shock absorbers having axes circumferentially spaced around said axial axis in alternating relation with said coil springs.

9. A drive according to claim 1 wherein said fluid control member includes means for separately effecting reciprocation of said head member between actuations of said fluid release valve to quickly release fluid.

* * * * *